March 12, 1929. H. VON THADEN ET AL 1,705,274
STORAGE AND RECLAIMING APPARATUS
Filed Dec. 20, 1926 5 Sheets-Sheet 4

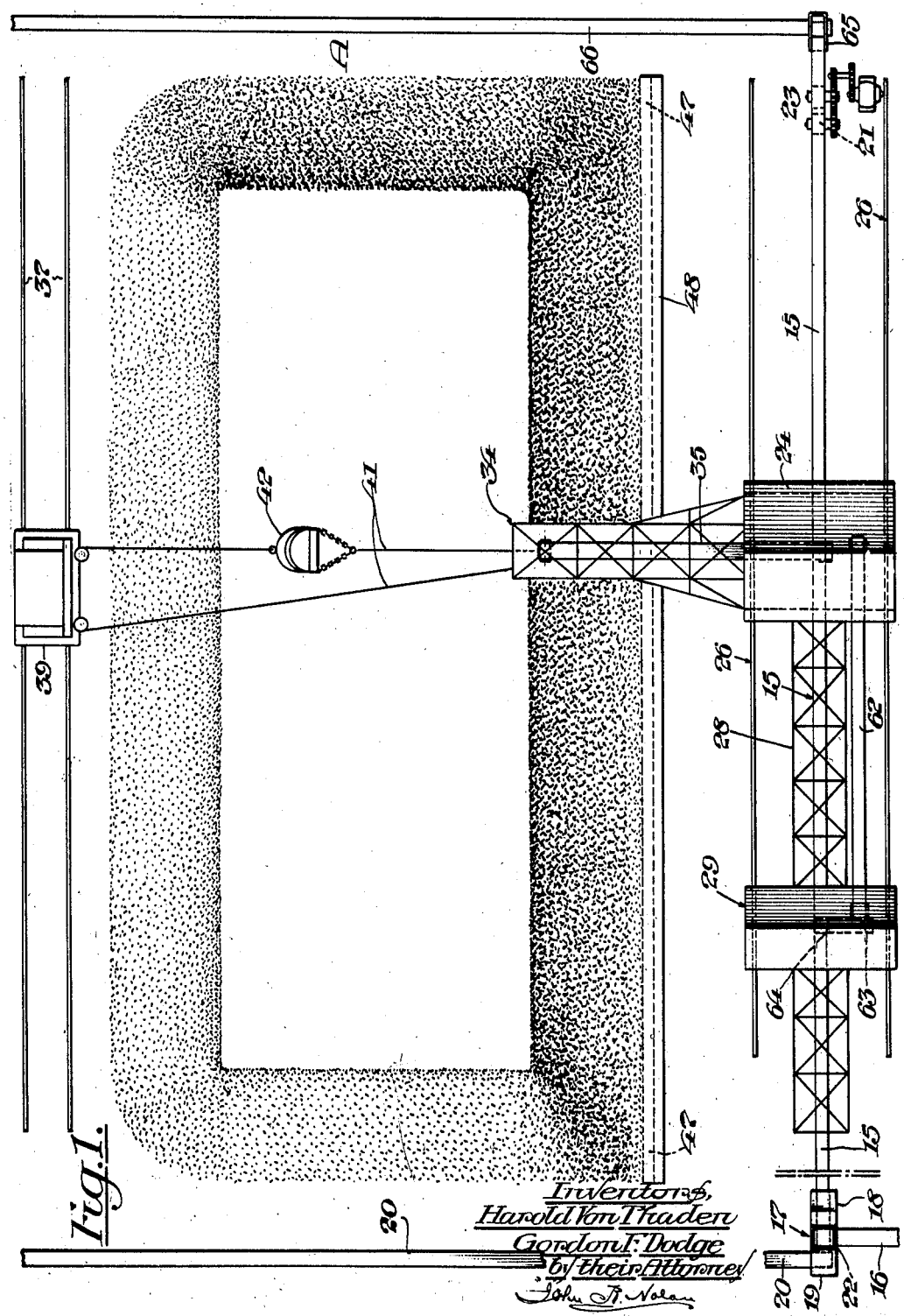

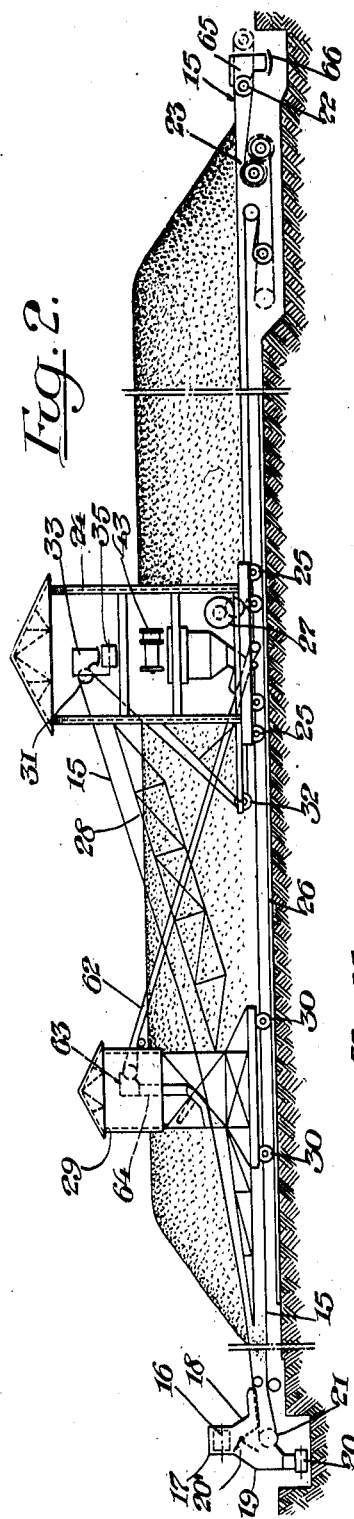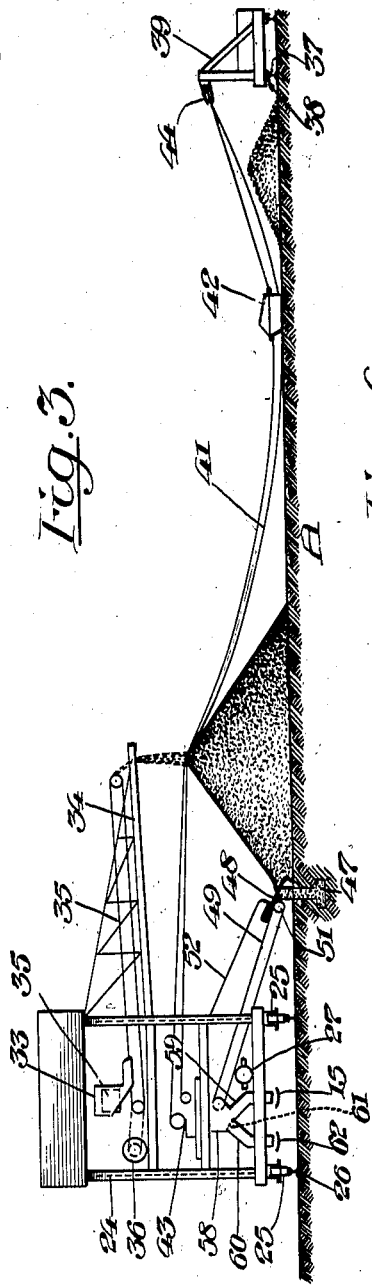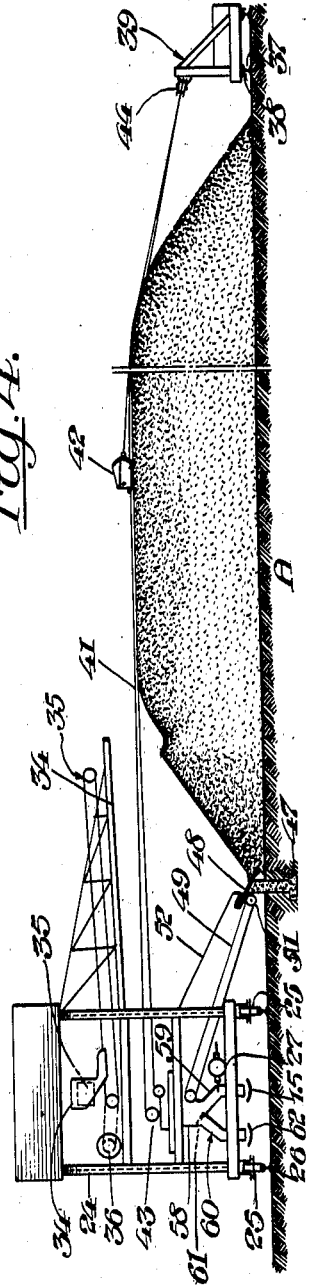

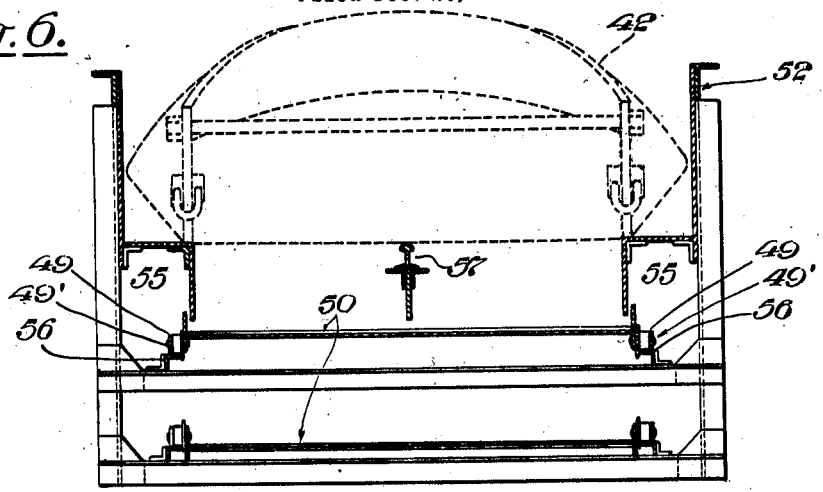
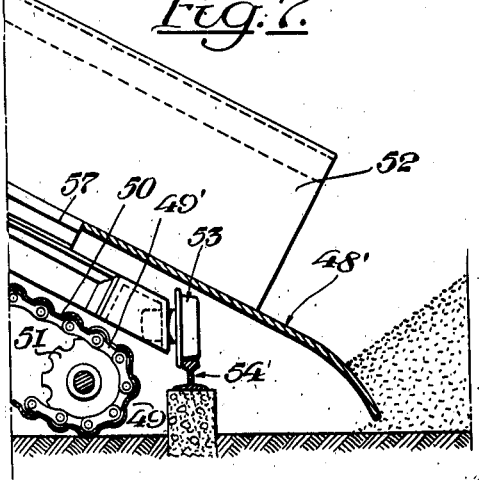
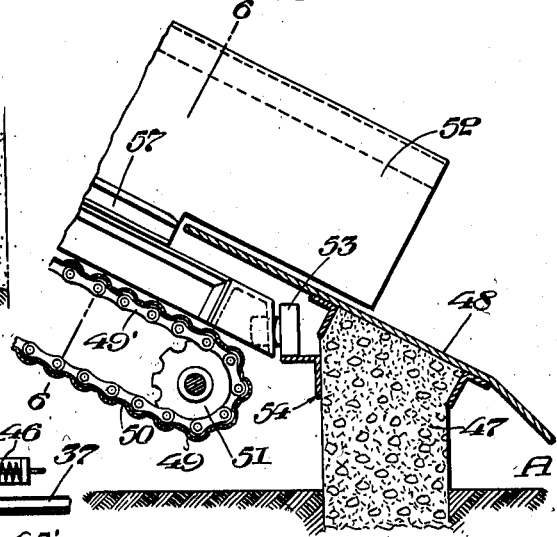
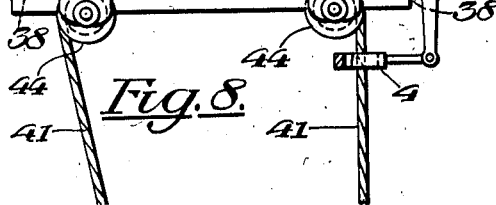

Inventors,
Harold Von Thaden
Gordon F. Dodge
by their Attorney
John T. Nolan

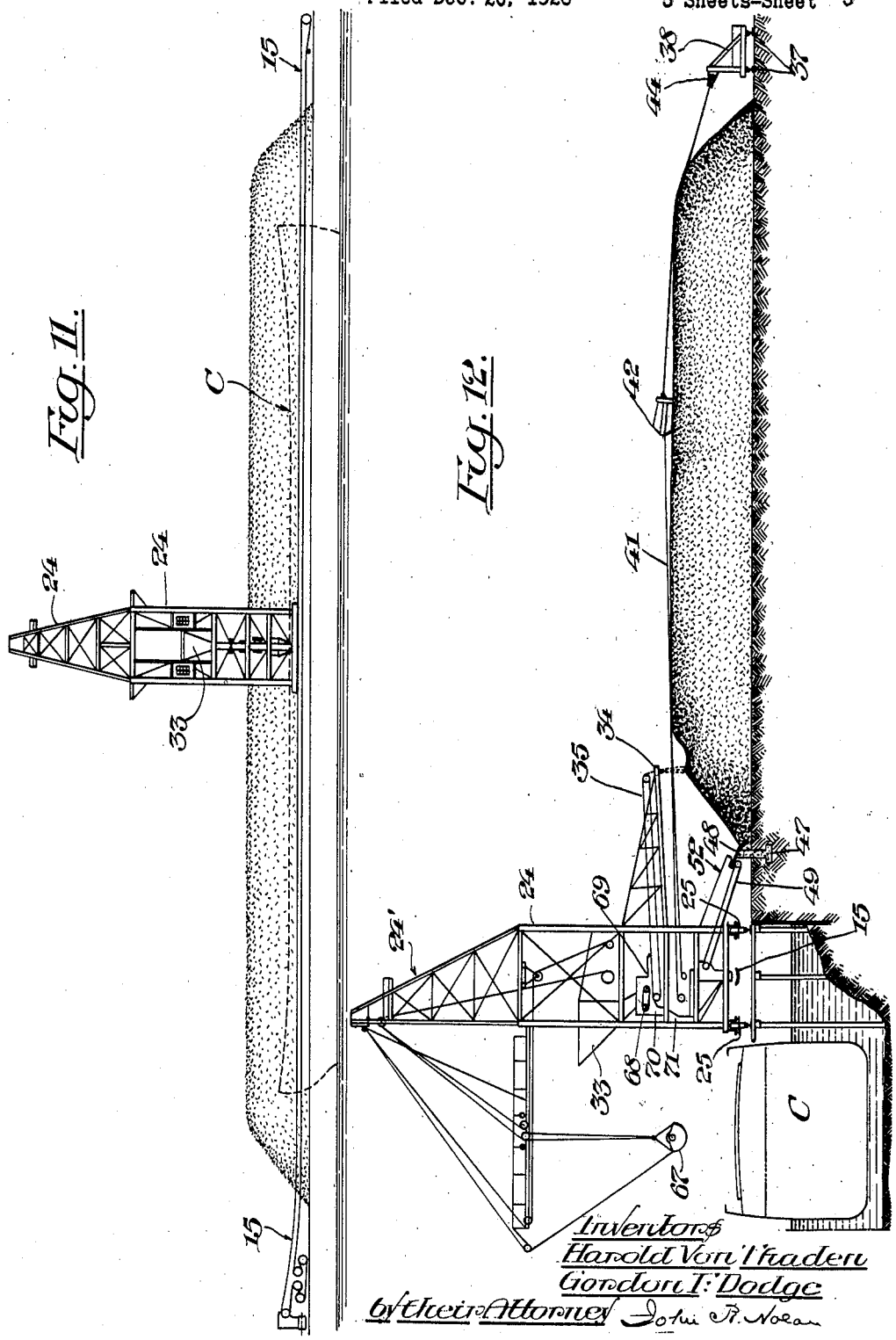

Patented Mar. 12, 1929.

1,705,274

UNITED STATES PATENT OFFICE.

HAROLD VON THADEN AND GORDON F. DODGE, OF NEW YORK, N. Y., ASSIGNORS TO ROBINS CONVEYING BELT COMPANY, OF PASSAIC, NEW JERSEY, A CORPORATION OF NEW JERSEY.

STORAGE AND RECLAIMING APPARATUS.

Application filed December 20, 1926. Serial No. 155,788.

This invention relates to storage and reclaiming apparatus for bulk materials, such as coal, sand, gravel, etc., having reference especially to the type of storage and reclaiming apparatus wherein are employed a drag line scraper and the necessary operating equipment therefor, as distinguished from the type of apparatus embodying a travelling gantry bridge and its appurtenances.

In the drag scraper system, as heretofore employed, the material to be stored on the storage area is delivered at a central point around which, by the proper operation of the scraper bucket, a more or less circular or rectangular pile of material is built, the reclaiming of the material from the pile back to the central point being made by a reverse operation of the bucket. The reclaimed material is delivered to a receiving hopper, cars, or other means, for transference to a distant point. It is obvious that with a circular or semi-circular storage pile the average distance from the central distributing and reclaiming point is two-thirds of the radius of the pile, and hence, in the case of storage areas of large capacity, an excessive average distance of travel of the drag bucket in the operation of storing and reclaiming the material is required, thus necessitating the use of a relatively large and expensive equipment, especially if a large hourly tonnage of material is to be handled.

The primary object of our invention is to provide a storage and reclaiming plant of simple and efficient construction and operation whereby large storage capacity, with greatly reduced distance of travel of the drag scraper outfit, is ensured, thus enabling the rapid and economic handling of the material by means of a comparatively small and easily manageable equipment.

With this and other objects in view, our invention, generally stated, comprehends a storage and reclaiming plant comprising a travelling structure operable adjacent to and longitudinally of one side of a storage area and having means for delivering the material in an initial pile along such side of the storage area, a second travelling structure located adjacent the opposite side of the storage area and movable therealong correspondingly with the first-named structure, a drag scraper whereof the operating cables are supported by and between the two travelling structures in such a manner as to span and also to traverse the storage area, and mechanism carried by one of said structures for operating said cables to drag the scraper transversely of the storage area at succeeding intervals in the longitudinal travel of the two structures, either to effect the distribution of the initial pile of material on the storage area or to reclaim the stored material at the first-named structure, as desired.

The invention also comprises such a storage and reclaiming plant having a trunk line belt conveyor extending along one side of the storage area and in co-operative relation to the adjacent travelling structure, which conveyor is adapted to receive the material at a convenient point and transport it to the said structure, which structure is equipped with appropriate means to effect the discharge of the material from the conveyor to the initial pile delivery means carried by said structure.

The invention also comprises such a storage and reclaiming plant wherein the said travelling structure at the front of the storage area is provided with means operative to receive the reclaimed material and transfer it to the trunk line conveyor for transportation by the latter to a point of discharge.

The invention also comprises novel features of construction and combinations of parts which will be hereinafter described and claimed.

In the drawings—

Figure 1 is a plan of a storage and reclaiming apparatus embodying one form of our invention.

Fig. 2 is a side elevation of the same.

Fig. 3 is an end view showing an initial pile of material as deposited at one side of the storage area preparatory to the distribution of the pile by the operation of the drag bucket.

Fig. 4 is a similar view showing the operation of the drag bucket upon the stored material during the reclaiming operation.

Fig. 5 is a vertical section, enlarged, of the front side of the storage area, and the adjacent portion of the conveyor and feed trough to which the material is delivered by the drag bucket during the reclaiming operation.

Fig. 6 is a transverse section, as on the line 6—6 of Fig. 5.

Fig. 7 is a section, similar to Fig. 5, showing a modified form of the receiving portion of the feed trough.

Fig. 8 is a partial plan, enlarged, of the travelling back structure, indicating the motor controlling connections.

Fig. 9 is a plan of a modification of the apparatus designed for double pile operation.

Fig. 10 is an end elevation of the construction shown in Fig. 9.

Fig. 11 is a side elevation of a modification of the apparatus designed for use in connection with a storage area located adjacent a dock.

Fig. 12 is a sectional end elevation thereof.

Referring to Figs. 1 to 8, inclusive, of the drawings, A designates an elongated storage area of generally rectangular formation, upon and throughout which the material is to be piled, or from which area the stored material is to be reclaimed.

Adjacent to and parallel with one long side of the storage area is a trunk line belt conveyor 15 to one end of which the material to be stored is delivered from a suitable source of supply. In the present instance the material is delivered upon the left hand end of the conveyor. This may be effected through an unloading hopper, if the material is received by rail; or by means of a conveyor, such as indicated at 16, if the material is received direct from a mine or quarry or other remote source of supply. We have herein illustrated a feed hopper 17 into which the material is delivered by the conveyor 16, said hopper having two diverging discharge legs 18, 19, one of which leads to the conveyor 15 and the other to an off-bearing conveyor 20 hereinafter referred to. This hopper 17 is provided at the apex of the legs with a swinging gate 20′ which may be operated to open or close either of the legs, and thus deliver the material to either conveyor 15 or 20, as desired.

The trunk line conveyor passes about suitable guide pulleys 21, 22 mounted at its receiving and head ends, respectively. The conveyor is actuated by any usual or approved drive mechanism adapted to impel the upper run of the conveyor from left to right, or the reverse, as desired. A reversible drive mechanism, of the tandem type, is conventionally indicated at 23, adjacent the head pulley. The upper run of the trunk line conveyor, which may be supported by suitable troughing idlers as usual, extends through a travelling tower 24 supported upon traction wheels 25 adapted to run on suitably arranged track rails 26 extending throughout the length of the storage area. This structure is equipped with a suitable electric motor 27 and appropriate connections for impelling the structure along the trackway. In its course to and through the tower the upper run of the conveyor 15 is preferably deflected in a manner to deliver the material at any desired location or locations of the tower along the front of the storage area. Any other suitable means for progressively removing the material from the conveyor within the tower may be employed.

The tower, in the construction herein illustrated, includes a rearwardly inclined truss structure 28 together with a trailer 29 which is provided with wheels 30 adapted to run on the track rails 26. By this structure a portion of the upper run of the conveyor is guided upwardly to a suitably-located pulley 31 about which it is flexed within the tower, thence being trained in a reverse direction to a lower pulley 32 carried by a basal rear extension of the tower; about which lower pulley the conveyor is again flexed to continue its horizontal path to the head pulley 22. The material delivered to the receiving end of the upper run of the conveyor 15 is carried upwardly by the latter to the level of the pulley 31, and is there discharged into a suitably-supported hopper 33 in an upper floor of the tower. The arrangement of the pulleys 31, 32 is generally similar to that commonly employed in a travelling tripper for belt conveyors.

The tower is equipped with a laterally projecting boom 34 which overhangs the adjacent side of the storage area, and which boom is provided with a conveyor 35 upon the inner or receiving end of which the material is discharged from the hopper 33. The boom conveyor is driven from a suitable source of power, as indicated at 36, and the material delivered to such conveyor is carried outward thereby and deposited in an initial pile along the adjacent side of the storage area, as the tower is impelled along the trackway.

Adjacent to and parallel with the far side of the storage area are track rails 37 upon which are mounted the traction wheels 38 of a travelling back structure 39 which is adapted to be moved along the track and positioned in line with the tower. This back structure preferably is equipped with a suitable electric motor 40 and connections for impelling it concurrently with the tower.

Supported on and extending between the tower and the back structure are out-haul and in-haul cables 41 for a drag scraper bucket 42, which cables may be operated by means of an engine 43 located in the tower or in the back structure, as desired. Preferably the engine 43 is located in the tower, and the back structure is provided with suitably-disposed sheaves 44 for the guidance of the cables. Hence by properly operating the engine 43 the scraper bucket can be dragged back and forth across the storage area, in a manner to take the material from the initial pile deposited along the side of the storage area and distribute it upon the latter between the tower and the back structure; that is to say, as the initial pile is formed on the storage area the scraper bucket can be dragged back and forth at the succeeding locations of the tower and back structure to accomplish the uniform distribution of the material within the storage area. Since the travel of the scraper bucket for a large pile is relatively small, it is obvious that a drag line apparatus of greatly reduced size, as compared with prior systems, can be effectively used and a much greater area covered.

The motor 40 for the travelling back structure is preferably automatically controlled by the movement of the travelling front structure, in order to effect the concurrent travel of the two structures, and also to ensure their alignment when the drag cables are in operation. A simple and efficient means for this purpose consists in the provision on the back structure of a yoke 45 through which one of the cables 41 extends, which yoke is carried by a pivoted arm 45' of an electric switch which is adapted to control the operation of the motor 40. (See Fig. 8.)

The yoke is held normally in a central position by means of suitable springs 46, which yoke, when in this position, maintains the control switch in neutral condition, i. e., the motor is idle. At this stage the two structures are in alignment with each other, and the cable extends midway between the limbs of the yoke. In the initial movement of the front structure, to the right or left, the cable bears against the opposing right or left end of the yoke, and accordingly actuates the switch to effect the forward or reverse operation of the motor of the back structure; but when the motion of the front structure is stopped the pressure of the cable against the opposing end of the yoke is released, which yoke thereupon resumes its normal or central position and stops the motor of the back structure. Should the travelling back structure be out of line with the front structure, the cable, by its lateral pressure on the right or left end of the yoke, as the case may be, will ensure the forward or reverse movement of the back structure to effect automatically the alignment of the latter with the front structure. If desired the switch for determining the operation of the motor 40 to effect the concurrent operation and the alignment of the front and back travelling structures can be actuated through suitable electric connections under the influence of a control switch located in the tower.

In the case of a storage pile for coal at a large power plant, it is desirable that, in the reclaiming of the coal for final consumption, the material be delivered to an off-bearing conveyor such as indicated at 20, which conveyor extends to the power plant bins from the point where the trunk line conveyor actually receives the coal for storage. This is for the reason that much coal is taken direct from the receiving station to the power plant bins, and the shortest length of travel from the source of supply to the bins is desirable.

According to a feature of our invention means is provided whereby the coal is transferred from the storage area to the trunk line conveyor at succeeding locations between the receiving end of the latter and the tower, and is transported thereby to the off-bearing conveyor 20; the direction of travel of the trunk line conveyor under such condition of service being reversed, i. e., the upper run of the trunk line conveyor being impelled toward the receiving end of the apparatus.

A means herein illustrated for reloading the trunk line conveyor is of the following construction: Extending along the front of the storage area is a retaining wall 47 provided throughout its length with an inclined apron 48 which overhangs both sides of the wall, a portion of the front of the pile on the storage area reposing on the apron. Hence by the proper operation of the drag bucket between the tower and the back structure the material can be hauled from the pile toward and upon the apron. Underlying the outer edge of this apron is the lower end of a feed conveyor 49 which inclines upwardly and forwardly into the tower, and receives the material which is dragged forwardly by the operation of the bucket. This conveyor, which is preferably of the type wherein parallel chains 49' are connected by articulated cross-members 50, passes about suitably-located sprocket wheels 51, the upper and lower shafts whereof have their bearings in boxes at the respective ends of an inclined trough structure 52 which is carried by the tower. The upper shaft is actuated by drive connections from a suitably-located electric motor, for example. The projecting lower end of the trough structure is provided with supporting wheels 53 which run upon a suitably-located longitudinally extending guide rail 54 fixed on the outer side of the wall 47 beneath the apron 48. The side walls of this trough structure are provided along their inner lower portions with longitudinal casings 55 within which the upper runs of the chains of the feed conveyor are confined and protected. The chains 49' run on rails 56 within the respective casings, and the cross-members 50 span the space between the casings and constitute the bottom of the trough structure. The casings 55 serve not only as guards for the chains, but also as tracks which support and guide the bucket 42 when it is dragged into position within the mouth of the trough structure to deposit the material on the upper run of the feed conveyor. Overlying the lower portion of this conveyor, midway between the casings 55, is a track 57 which not only efficiently braces the trough structure, but also supports the body of the drag bucket when it is hauled into the trough structure. (See Figs. 5 and 6.)

Instead of erecting the wall 47 and mounting the apron 48 thereon, we may dispense with the wall and apron, and in lieu thereof affix to the lower end of the trough 52, so as to travel therewith, an inclined plate or shoe 48' which extends adjacent the storage floor and affords a support and guide for the drag scraper while it is transferring the material from the storage area to the feed conveyor. In this construction the supporting wheels 53 for the lower end of the trough run on a suitably-located track 54'. (See Fig. 7.)

The feed conveyor 49 carries the material along the interior of the inclined trough structure 52 to the summit of the latter, and there discharges such material into an underlying hopper 58 also supported on the tower. This hopper has preferably two diverging discharge legs 59, 60, the entrance to either of which is controlled by a manually operative swinging gate 61. The leg 59 overhangs the trunk line conveyor 15 (for a purpose hereinafter mentioned) and the leg 60 overhangs the lower end of an inclined belt conveyor 62 (termed a reloading conveyor) which extends to the trailer 29 of the tower. When the entrance to the discharge leg 60 is open, the reclaimed material is delivered to the reloading conveyor 62 and the latter discharges such material into a hopper 63 suitably supported on the trailer, which hopper 63 is provided with a discharge chute 64 leading to the upper run of the trunk line conveyor. Since the direction of travel of the upper run of the trunk line conveyor 15 during this reclaiming operation, is toward the receiving end of the conveyor 15, the material borne by the latter is carried to and deposited upon the off-bearing conveyor 20 previously referred to.

Where the arrangement of property and the space available for storage are such as to require that the material removed from the storage area be discharged at the head (or right hand end) of the trunk line conveyor, the hopper leg 60 is closed and the leg 59 is opened, by proper manipulation of the gate 61, the reclaimed material thus being directly delivered to the trunk line conveyor. In such case, the direction of travel of this conveyor is, of course, toward the head of the apparatus, and the material is therefore delivered at that end into a hopper 65 overlying one end of a suitably-located off-bearing belt, as 66, leading to a suitable point of discharge.

While we have herein illustrated and described our apparatus as installed for operation upon a rectangular storage area, and the travelling tower and back structure as arranged to travel on parallel tracks at the respective sides of such area, it is to be understood that an apparatus embodying our invention may be effectively operated in relation to a storage area of triangular or other contour, in which case the back structure would be arranged to travel either on a straight track at an angle with the trunk line conveyor or on an irregular track, or a curved track, according to the requirements of the outline of the storage pile or of the property available for storage purposes. In any such case the trunk line conveyor extends along one long side of the storage area, the tower with its boom conveyor co-operates with the trunk line conveyor, as previously described, and the drag scraper is operated back and forth between the tower and the travelling back structure to accomplish the efficient distribution of the succeeding initial front piles of material throughout the varying width or conformation of the storage area. Furthermore, an apparatus embodying our invention can be installed and effectively operated on sloping ground, whereas with a gantry bridge storage system a practically level area is necessary.

The hereinbefore described apparatus is designed to build a pile upon a storage area at one side only of the trunk line conveyor, but it is obvious that by a slight modification of the construction it can be efficiently employed for double pile operation, as illustrated in Figs. 9 and 10. In this modified form of our invention the trunk line conveyor is located between two storage areas A, B; and two boom conveyors 35, which extend in opposite directions over the adjacent sides of the respective storage areas, are carried by the tower. The hopper 33 is provided with two feeding legs leading to the respective boom conveyors. The drag scraper engine 43, is mounted on a turn-table 43' so that the engine may be positioned to face either side of the tower, and thus be available for delivering material to or removing it from either storage area, as desired.

A separate travelling back structure 38 and track 37 therefor, may be used for each storage space, as shown in Fig. 9; or, if desired, the back structure tracks may be connected by curved track sections at the ends of the two storage spaces as shown by dotted lines in Fig. 9, and a single back structure and drag bucket outfit thus be available for both storage areas.

In the duplex structure just referred to the travelling tower is provided with duplicate reclaiming devices, as illustrated.

In Figs. 11 and 12 we have illustrated a modification of the apparatus wherein the storage area is located alongside and parallel with a dock front; the material being received by boat. In this modification the upper run of the trunk line conveyor 15 extends directly underneath the travelling tower 24, instead of being inclined and deflected, as in the other constructions described. This tower is provided with a superposed steeple tower 24' in which is located suitable mechanism for operating a grab bucket 67 adapted to unload the material from the boat C. A reversible feed conveyor 68 is interposed between the receiving hopper 33 on the tower and the boom conveyor 35, for the purpose of properly loading the boom conveyor with a continuous stream of material since the material is necessarily dumped into the hopper in batches by the grab bucket. An apparatus of the character just described is more especially adapted to supply coal to a large power plant located adjacent a river or other water front, and, as in such service a considerable portion of the coal is delivered direct to the plant, without being placed in storage, discharge chutes 69, 70 are arranged at the respective ends of the feed conveyor; the chute 69 for delivering to the boom conveyor when coal is being put into the storage pile, and the chute 70 for delivering through a by-pass chute 71 to the trunk line conveyor, when the coal is going direct to the plant bins.

The apparatus illustrated in Figs. 11 and 12 can be utilized also for handling material received from cars or other means, in which case the material is supplied to the upper run of the trunk line conveyor, and the latter is inclined and deflected to discharge the material into the feed hopper for the boom conveyor as in the first described constructions.

While we have herein illustrated and described various forms of embodiment of our invention, it is to be understood that our invention is not limited to the particular constructions disclosed, as the same may be modified within the principle of our invention and the scope of the appended claims.

We claim—

1. An apparatus of the kind described, comprising a travelling structure operable adjacent to and longitudinally of one side of a storage area, means carried by said structure for delivering material in an initial pile along such side of the storage area, means for supplying material to said side delivery means, means mounted on and movable with said structure adapted to receive reclaimed material from the storage area and deliver it to said supplying means, a second travelling structure located adjacent the opposite side of the storage area and movable therealong correspondingly with the first-named structure, a drag scraper whereof the operating cables are supported by and between the two travelling structures so as to span and also traverse the storage area, and mechanism mounted in one of said structures for operating said cables to drag the scraper transversely of the storage area, and thereby effect the distribution of the material on the storage area or the transference of the stored material to the said receiving means of the first-named travelling structure, as desired.

2. An apparatus of the kind described, comprising a travelling structure operable adjacent to and longitudinally of one side of a storage area, means carried by said structure for delivering material in an initial pile along such side of the storage area, a motor for actuating said structure, means for supplying material to said side delivery means, means mounted on and movable with said structure adapted to receive reclaimed material from the storage area and deliver it to said supplying means, a second travelling structure located adjacent the opposite side of the storage area and movable therealong correspondingly with the first-named structure, a motor for actuating said second structure, a drag scraper whereof the operating cables are supported by and between the two travelling structures so as to span and also traverse the storage area, mechanism mounted in one of the said structures for operating said cables to drag the scraper transversely of the storage area and thereby effect the distribution of the material on the storage area or the transference of the stored material to the said receiving means of the first-named travelling structure, and means whereby the operation of the motor of the second-named structure is controlled to effect the alignment of the latter with the first-named structure.

3. An apparatus of the kind described, comprising a travelling structure operable adjacent to and longitudinally of one side of a storage area, means carried by said structure for delivering material in an initial pile along such side of the storage area, a motor for actuating said structure, means for supplying material to said side delivery means, means mounted on and movable with said structure adapted to receive reclaimed material from the storage area and deliver it to said supplying means, a second travelling structure located adjacent the opposite side of the storage area and movable therealong correspondingly with the first-named structure, a motor for actuating said second structure, a drag scraper whereof the operating cables are supported by and between the two travelling structures so as to span and also traverse the storage area, mechanism mounted in one of the said structures for operating said cables to drag the scraper transversely of the storage area and thereby effect the distribution of the material on the storage area or the transference of the stored material to the said receiving means of the first-named travelling structure, and means actuated by the said cables for controlling the operation of the motor for the second-named travelling structure.

4. An apparatus of the kind described, comprising a travelling structure operable adjacent to and longitudinally of one side of a storage area, means carried by said structure for delivering material in an initial pile along the adjacent side of the storage area, a conveyor extending along such side of the storage area and in co-operative relation to the travelling structure, feed means carried by said travelling structure and arranged to deliver reclaimed material to the conveyor, a second travelling structure located adjacent the opposite side of the storage area and movable therealong correspondingly with the first-named structure, a drag scraper whereof the operating cables are supported by and between the two travelling structures so as to span and traverse the storage area, and mechanism mounted in one of the said structures for operating said cables to drag the scraper transversely of the storage area and thereby effect the distribution of the material on the storage area or the transference of the stored material to the said feed means on the first-named travelling structure.

5. An apparatus of the kind described, comprising a travelling structure operable adjacent to and longitudinally of one side of a storage area, means carried by said structure for delivering material in an initial pile along the adjacent side of the storage area, a conveyor extending along such side of the storage area and in co-operative relation to the travelling structure, means carried by said structure to effect the discharge of material from the conveyor and upon the side delivery means, means mounted on and movable with said structure adapted to receive reclaimed material from the storage area and deliver it to said conveyor, a second travelling structure located adjacent the opposite side of the storage area and movable therealong correspondingly with the first-named structure, a drag scraper whereof the operating cables are supported by and between the two travelling structures so as to span and also traverse the storage area, and mechanism mounted in one of the said structures for operating said cables to drag the scraper transversely of, and effect the distribution of the material on the storage area, or effect the transference of the stored material to the said receiving means.

6. An apparatus of the kind described, comprising a travelling structure operable adjacent to and longitudinally of one side of a storage area, means carried by said structure for delivering material in an initial pile along the adjacent side of the storage area, a trunk line conveyor extending along such side of the storage area and in co-operative relation to the travelling structure, means carried by said structure to effect the discharge of material from the conveyor and upon the side delivery means, feed means carried by said travelling structure and arranged to receive material reclaimed from the storage area and deliver it to the conveyor, a second travelling structure located adjacent the opposite side of the storage area and movable therealong correspondingly with the first-named structure, a drag scraper whereof the operating cables are supported in and between the two travelling structures so as to span and also traverse the storage area, and mechanism mounted in one of the said structures for operating said cables to drag the scraper transversely of the storage area, and thereby effect the distribution of the material on the storage area or the transference of the stored material to said feed means on the first-named travelling structure, as desired.

7. An apparatus of the kind described, comprising a travelling structure operable adjacent to and longitudinally of one side of a storage area, means carried by said structure for delivering material to and along the adjacent side of the storage area, a conveyor extending along such side of the storage area and in co-operative relation to the travelling structure, said structure having means for deflecting the path of the upper run of the conveyor in a manner to discharge to and upon the side delivery means the material carried by the conveyor, means, including a hopper overhanging the conveyor in advance of the deflected path, for receiving reclaimed material and delivering it to the said conveyor, a second travelling structure located adjacent the opposite side of the storage area and movable therealong correspondingly with the first-named structure, a drag scraper whereof the operating cables are supported in and extend between the said structures so as to span and also traverse the storage area, and mechanism mounted in one of the said structures for operating said cables to drag the scraper transversely of, and effect the distribution of the material on the storage area, or effect the transference of the stored material to the said receiving means.

8. An apparatus of the kind described, comprising a travelling structure operable adjacent to and longitudinally of one side of a storage area, means carried by said structure for delivering material to and along the adjacent side of the storage area, a conveyor extending along such side of the storage area and in co-operative relation to the travelling structure, said structure having means for deflecting the path of the upper run of the conveyor in a manner to discharge to and upon the side delivery means the material carried by the conveyor, feed means carried by said travelling structure and arranged to receive material reclaimed from the storage area and deliver it to the said conveyor, a second travelling structure located adjacent the opposite side of the storage area and movable therealong correspondingly with the first-named structure, a drag scraper whereof the operating cables are supported by and between the two travelling structures so as to span and traverse the storage area, and mechanism mounted in one of the said structures for operating said cables to drag the scraper transversely of the storage area, and thereby effect the distribution of the material on the storage area or the transference of the stored material to the said feed means on the first-named travelling structure, as desired.

9. An apparatus of the kind described, comprising a travelling structure operable adjacent to and longitudinally of one side of the storage area, means carried by said structure for delivering material in an initial pile along the adjacent side of the storage area, a conveyor extending along the side of the storage area and in co-operative relation to the travelling structure, means for driving said conveyor to impel its upper run toward or from the receiving end of the conveyor, as desired, means carried by said structure to effect the discharge of material from the conveyor and upon the side delivery means when the upper run of the conveyor is travelling in a direction away from its receiving end, feed means carried by said travelling structure and arranged to deliver reclaimed material to the conveyor at a point between the said structure and the receiving end of the conveyor, a second travelling structure located adjacent the opposite side of the storage area and movable therealong correspondingly with the first-named structure, a drag scraper whereof the operating cables are supported by and between the two travelling structures so as to span and traverse the storage area, and mechanism mounted in one of the said structures for operating said cables to drag the scraper transversely of the storage area, and thereby effect the distribution of the material on the storage area while the conveyor is moving in a direction away from the receiving end thereof, or the transference of the stored material to the said feed means on the first-named structure when the conveyor is moving in a reverse direction, as desired.

10. The combination with a travelling structure operable adjacent to and longitudinally of one side of a storage area, means carried by said structure for delivering material to and along the adjacent side of the storage area, a conveyor extending along such side of the storage area and in co-operative relation to the travelling structure, feed means carried by said structure and arranged to deliver reclaimed material to the conveyor, said feed means including a trough, an endless conveyor therein and transfer means between the two conveyors, a second structure located adjacent the opposite side of the storage area, a drag scraper whereof the operating cables are supported by and between the two structures so as to span and traverse the storage area, and mechanism mounted in one of said structures for operating said cables to drag the scraper transversely of the storage area and into the mouth of the said trough.

11. The combination with a travelling structure operable adjacent to and longitudinally of one side of a storage area, means carried by said structure for delivering material to and along the adjacent side of the storage area, a conveyor extending along such side of the storage area and in co-operative relation to the travelling structure, feed means carried by said structure and arranged to deliver reclaimed material to the conveyor, said feed means including a trough having scraper guides at its mouth, a conveyor in said trough and transfer means between the two conveyors, a second structure located adjacent the opposite side of the storage area, a drag scraper whereof the operating cables are supported by and between the two structures so as to span and traverse the storage area, and mechanism mounted in one of said structures for operating said cables to drag the scraper transversely of the storage area and into the mouth of the said trough.

12. In an apparatus of the kind described, a storage area having a wall along one side thereof, and an inclined apron on said wall, a travelling structure operable adjacent to and longitudinally of said wall, means carried by said structure for delivering material in an initial pile along the side of the storage area adjacent the said wall, a conveyor extending along the wall and in co-operative relation to the travelling structure, feed means carried by said structure and arranged to deliver reclaimed material to the conveyor, a second structure located adjacent the opposite side of the storage area and movable therealong correspondingly with the first-named structure, a drag scraper whereof the operating cables are supported by and between the two structures so as to span and traverse the storage area, and mechanism mounted in one of said structures for operating said cables to drag the scraper transversely of the storage area and across the apron to the said feed means of the first-named travelling structure.

13. In an apparatus of the kind described, a storage area having a wall along one side thereof, and an inclined apron on said wall, a travelling structure operable adjacent to and longitudinally of said wall, means carried by said structure for delivering material in an initial pile along the side of the storage area adjacent the said wall, a conveyor extending longitudinally of the wall and in co-operative relation to the travelling structure, feed means carried by said structure and arranged to deliver reclaimed material to the conveyor, said feed means including an inclined trough, a conveyor therein and transfer means between the two conveyors, a second structure located adjacent the opposite side of the storage area and movable therealong correspondingly with the first-named structure, a drag scraper whereof the operating cables are supported by and between the two structures so as to span and traverse the storage area, and mechanism mounted in one of said structures for operating said cables to drag the scraper transversely of the storage area across the apron and into the mouth of the said trough.

Signed at New York in the county and State of New York this 18th day of Dec. A. D. 1926.

HAROLD VON THADEN.
GORDON F. DODGE.